(12) United States Patent
Huang

(10) Patent No.: US 10,201,131 B1
(45) Date of Patent: Feb. 12, 2019

(54) FOLDABLE GARDENING SHEAR

(71) Applicant: Yao-Chung Huang, Changhua (TW)

(72) Inventor: Yao-Chung Huang, Changhua (TW)

(73) Assignee: Ho Cheng Garden Tools Co. Ltd., Changhua (TW)

( * ) Notice: Subject to any disclaimer, the term of this patent is extended or adjusted under 35 U.S.C. 154(b) by 0 days.

(21) Appl. No.: 15/697,686

(22) Filed: Sep. 7, 2017

(51) Int. Cl.
| | | |
|---|---|---|
| *A01G 3/04* | (2006.01) | |
| *A01G 3/025* | (2006.01) | |
| *B25F 1/04* | (2006.01) | |
| *A01G 3/08* | (2006.01) | |
| *B25F 1/00* | (2006.01) | |

(52) U.S. Cl.
CPC .............. *A01G 3/0255* (2013.01); *A01G 3/04* (2013.01); *A01G 3/083* (2013.01); *B25F 1/04* (2013.01); *B25F 1/003* (2013.01)

(58) Field of Classification Search
CPC . A01G 3/04; A01G 3/083; B25G 3/38; Y10T 16/54026; Y10T 16/5404; Y10T 403/32254; Y10T 403/32262; Y10T 403/32426; Y10T 403/32549; Y10T 403/32557; Y10T 403/32352; Y10T 403/32319; Y10T 403/32336; Y10T 403/32344; Y10T 403/32327; B26B 17/02; F16C 11/04
IPC .......................... A01G 3/04,3/083; B25G 3/38
See application file for complete search history.

(56) References Cited

U.S. PATENT DOCUMENTS

| 1,171,765 | A | * | 2/1916 | Benjamin | ............... A47L 9/325 403/95 |
| 2,559,473 | A | * | 7/1951 | Slodek, Sr. | ........... A61F 5/0102 403/62 |
| 2012/0304473 | A1 | * | 12/2012 | Panosian | ................. B26B 17/02 30/192 |

* cited by examiner

*Primary Examiner* — Kenneth E. Peterson
*Assistant Examiner* — Liang Dong
(74) *Attorney, Agent, or Firm* — Che-Yang Chen; Law Offices of Scott Warmuth

(57) ABSTRACT

A foldable gardening shear may comprise a main body, a pair of handles, and a pair of pivot members. Each of the pivot members has a control unit, a knob, a screw and a pair of covers. The main body comprises a first pivot pin pivotally connect to a pair of cutting members at a middle portion of the main body. Each of the cutting members has a blade formed at an upper portion thereof, and the two blades are configured to couple together to achieve the cutting effect. The present invention is advantageous because the handles can be folded upwardly, which enables the gardening shear to be carried and stored easily; and in the folded position, the handles are respectively located at two lateral sides of the cutting members, which can prevent the blades from hurting the user.

7 Claims, 7 Drawing Sheets

FOLDABLE GARDENING SHEAR

FIELD OF THE INVENTION

The present invention relates to a gardening shear and more particularly to a foldable gardening shear.

BACKGROUND OF THE INVENTION

Generally, a conventional gardening shear comprises a pair of blades pivotally connected through a pivot, and the pivot further pivotally connects a pair of arms at the other side such that a user can operate the arms to cut plants through blades.

However, the conventional gardening shear is disadvantageous because: after pivotally connecting the arms with the blades, the gardening shear may become too long to be carried or stored easily if the arms cannot be folded. Therefore, there remains a need for a new and improved design for a foldable gardening shear to overcome the problems presented above.

SUMMARY OF THE INVENTION

The present invention provides a foldable gardening shear which comprises a main body, a pair of handles, and a pair of pivot members. Each of the pivot members has a control unit, a knob, a screw and a pair of covers. The main body comprises a first pivot pin pivotally connect to a pair of cutting members at a middle portion of the main body. Each of the cutting members has a blade formed at an upper portion thereof, and the two blades are configured to couple together to achieve the cutting effect. Moreover, each of the cutting members has a first connecting portion formed at a lower end thereof, and when the pair of blades is coupled together, the width between the two first connecting portions is wider than the coupled blades. Each of the first connecting portions has a first engaging slot and a second engaging slot respectively formed at an upper edge and a lower edge thereof, and a first engaging hole penetrates through a middle portion of the first connecting portion. Additionally, each of the cutting members further comprises a stepped first abutting portion located at a lower end thereof adjacent to the first connecting portion. Each of the handles has a pair of locating members formed at an upper end thereof, and the two locating members located at two corresponding positions are separated with a defined distance to form a second connecting portion therebetween. Furthermore, two lateral edges of the locating members are coupled together to form an abutting block. In addition, each of the two locating members comprises a first connecting hole, a second connecting hole, and a through hole respectively penetrating therethrough and arranged from top to bottom, and each of the two first connecting holes, the two second connecting holes, and the two through holes are respectively aligned with each other. Each of the control units comprises a second abutting portion having a curved surface, and a first groove and a second groove are formed thereon and spaced apart by a defined distance. Moreover, a third connecting hole penetrates through a middle portion of the control unit. A pulling block is coupled to an edge of the control unit to form a T-shape, and an upper edge of the control unit has a concave to form a protruding portion at an edge of the control unit opposed to the pulling block. Additionally, the second abutting portion is resilient and configured to bounce back to an initial position thereof after compressed. Each of the knobs has a threaded rod protruding from an inner surface thereof, and each of the covers comprises a second engaging hole and a third engaging hole. Also, the pair of covers is configured to fit together, and at least one of the two covers has a locating pin protruding from an inner surface thereof.

Comparing with conventional gardening shear, the present invention is advantageous because: (i) the handles can be folded upwardly, which enables the gardening shear to be carried and stored easily; and (ii) in the folded position, the handles are respectively located at two lateral sides of the cutting members, which can prevent the blades from hurting the user.

DETAILED DESCRIPTION OF THE INVENTION

Figure 1:
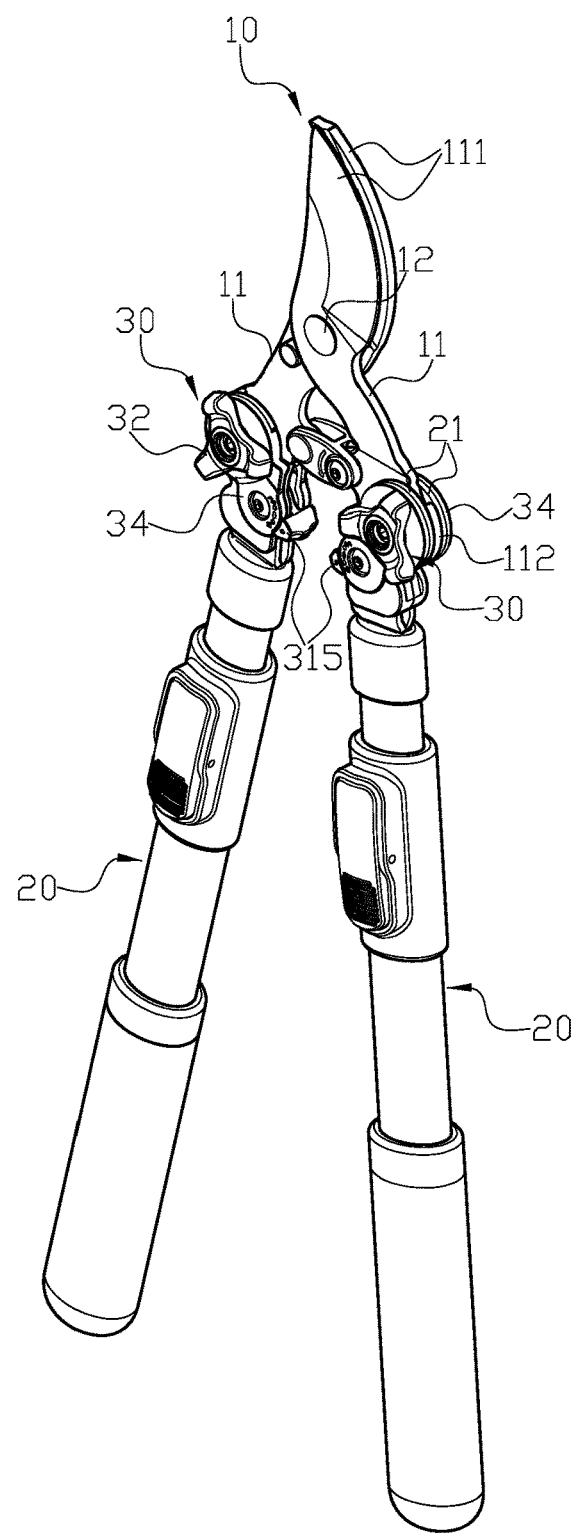
FIG. 1 is a three-dimensional assembly view of a foldable gardening shear in the present invention.
Figures 2, 3:
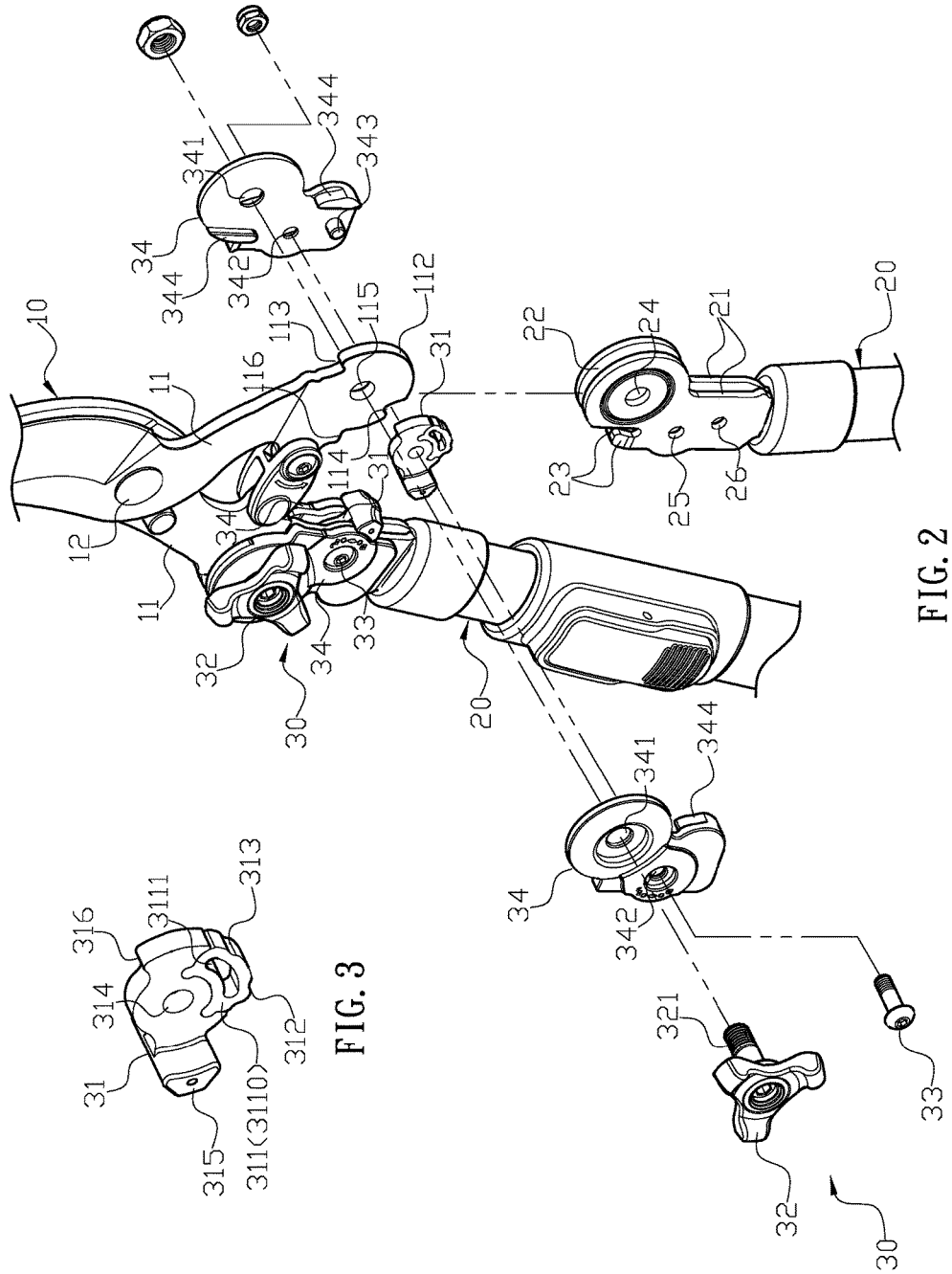
FIG. 2 is a three-dimensional exploded view of the foldable gardening shear in the present invention.
FIG. 3 is a three-dimensional enlarged view of a control unit of the foldable gardening shear in the present invention.
Figure 4:
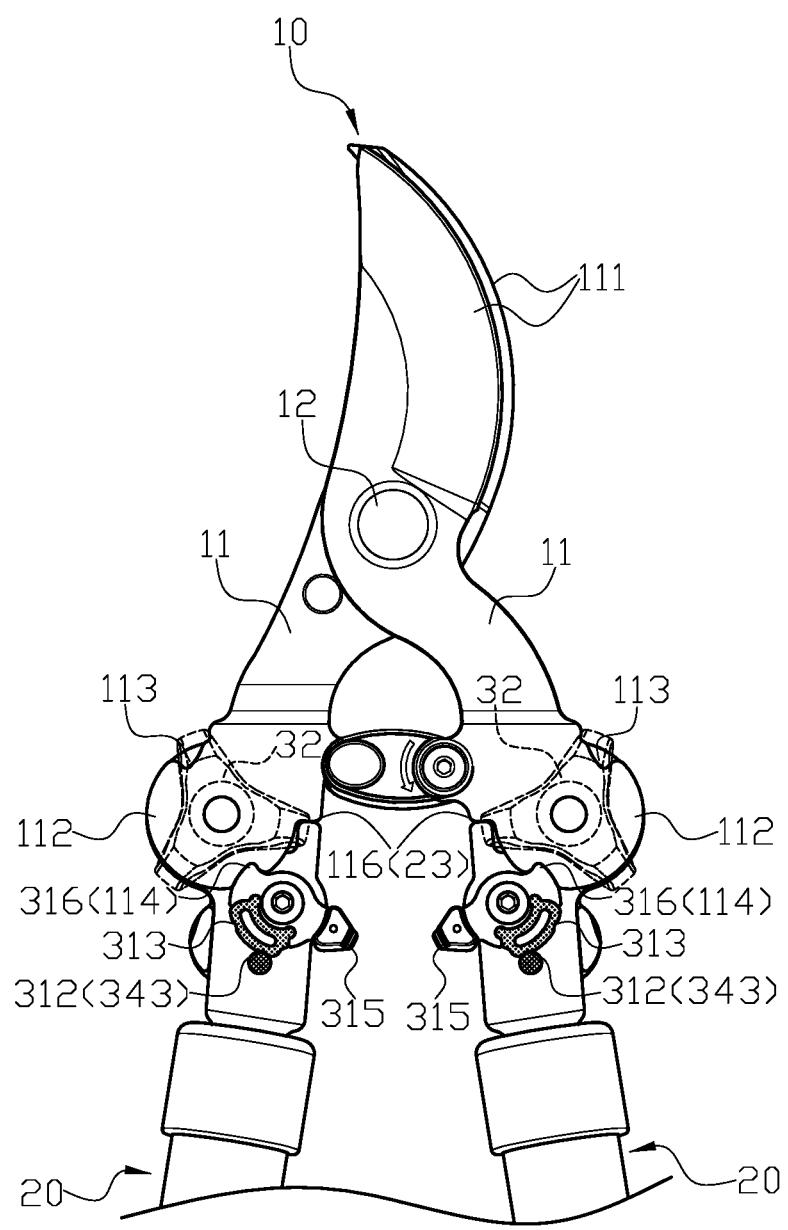
FIG. 4 is a plan assembly view of the foldable gardening shear in the present invention.

The detailed description set forth below is intended as a description of the presently exemplary device provided in accordance with aspects of the present invention and is not intended to represent the only forms in which the present invention may be prepared or utilized. It is to be understood, rather, that the same or equivalent functions and components may be accomplished by different embodiments that are also intended to be encompassed within the spirit and scope of the invention.

Unless defined otherwise, all technical and scientific terms used herein have the same meaning as commonly understood to one of ordinary skill in the art to which this invention belongs. Although any methods, devices and materials similar or equivalent to those described can be used in the practice or testing of the invention, the exemplary methods, devices and materials are now described.

All publications mentioned are incorporated by reference for the purpose of describing and disclosing, for example, the designs and methodologies that are described in the publications that might be used in connection with the presently described invention. The publications listed or discussed above, below and throughout the text are provided solely for their disclosure prior to the filing date of the present application. Nothing herein is to be construed as an admission that the inventors are not entitled to antedate such disclosure by virtue of prior invention.

In order to further understand the goal, characteristics and effect of the present invention, a number of embodiments along with the drawings are illustrated as following:

Referring to FIGS. 1 to 4, the present invention provides a foldable gardening shear which comprises a main body (10), a pair of handles (20), and a pair of pivot members (30). Each of the pivot members (30) has a control unit (31), a knob (32), a screw (33) and a pair of covers (34). The main body (10) comprises a first pivot pin (12) pivotally connect to a pair of cutting members (11) at a middle portion of the main body (10). Each of the cutting members (11) has a blade (111) formed at an upper end thereof, and the two blades (111) are configured to couple together to achieve the cutting effect. Moreover, each of the cutting members (11) has a first connecting portion (112) formed at a lower end thereof, and when the pair of blades (111) is coupled together, the width between the two first connecting portions (112) is wider than the coupled blades (111). Each of the first connecting portions (112) has a first engaging slot (113) and a second engaging slot (114) respectively formed at an upper edge and a lower edge thereof, and a first engaging hole (115) penetrates through a middle portion of the first connecting portion (112). Additionally, each of the cutting members (11) further comprises a stepped first abutting portion (116) located at a lower end thereof adjacent to the first connecting portion (112). Each of the handles (20) has a pair of locating members (21) formed at an upper end thereof, and the two locating members (21) located at two corresponding positions are separated with a defined distance to form a second connecting portion (22) therebetween. Furthermore, two lateral edges of the locating members (21) are coupled together to form an abutting block (23). In addition, each of the two locating members (21) comprises a first connecting hole (24), a second connecting hole (25), and a through hole (26) respectively penetrating therethrough and arranged from top to bottom, and each of the two first connecting holes (24), the two second connecting holes (25), and the two through holes (26) are respectively aligned with each other. Each of the control units (31) comprises a second abutting portion (311) having a curved surface, and a first groove (312) and a second groove (313) are formed thereon and spaced apart by a defined distance. Moreover, a third connecting hole (314) penetrates through a middle portion of the control unit (31). A pulling block (315) is coupled to an edge of the control unit (31) to form a T-shape, and an upper edge of the control unit (31) has a concave to form a protruding portion (316) at an edge of the control unit (31) opposed to the pulling block (315). Additionally, the second abutting portion (311) is resilient and configured to bounce back to an initial position thereof after compressed. Each of the knobs (32) has a threaded rod (321) protruding from an inner surface thereof, and each of the covers (34) comprises a second engaging hole (341) and a third engaging hole (342). Also, the pair of covers (34) is configured to fit together, and at least one of the two covers (34) has a locating pin (343) protruding from an inner surface thereof.

Since the connecting mechanism of the cutting member (11), the handle (20), and the pivot member (30) at one side of the foldable gardening shear of the present invention is identical to the other, only one side of connection is described below. Structurally, referring to FIGS. 1 to 4, the control unit (31) and the first connecting portion (112) of the main body (10) are sequentially put into the corresponding second connecting portion (22) of the handle (20), and the third connecting hole (314) is aligned with the two second connecting holes (25) on the handle (20) while the two first connecting holes (24) of the handle (20) are aligned with the first engaging hole (115) of the first connecting portion (112). Additionally, the protruded pulling block (315) which cannot be put into the second connecting portion (22) is coupled at an inner edge of the locating members (21). The two corresponding covers (34) of the pivot member (30) are configured to fit together to surround the two locating members (21), and the locating pin (343) is adapted to sequentially pass through one of the two aligned through holes (26), the second connecting portion (22), and the other through hole (26). Moreover, the threaded rod (321) of the knob (32) is configured to sequentially pass through the second engaging hole (341) of the cover (34) at a first side of the first engaging hole (115), the first connecting hole (24) of the locating member (21) at the first side of the first engaging hole (115), the first engaging hole (115), the first connecting hole (24) of the corresponding locating member (21) at a second side of the first engaging hole (115), and the second engaging hole (341) of the corresponding cover (34) at the second side of the first engaging hole (115) to engage with a nut. Similarly, the screw (33) is adapted to sequentially pass through the third engaging hole (342) of the cover (34) at a first side of the third connecting hole (314), the second connecting hole (25) of the locating member (21) at the first side of the third connecting hole (314), the third connecting hole (314), the second connecting hole (25) of the corresponding locating member (21) at a second side of the third connecting hole (314), and the third engaging hole (342) of the corresponding cover (34) at the second side of the third connecting hole (314) to engage with a nut. Thus, the handle (20) and the pivot member (30) are connected to the main body (10).

Figure 5:
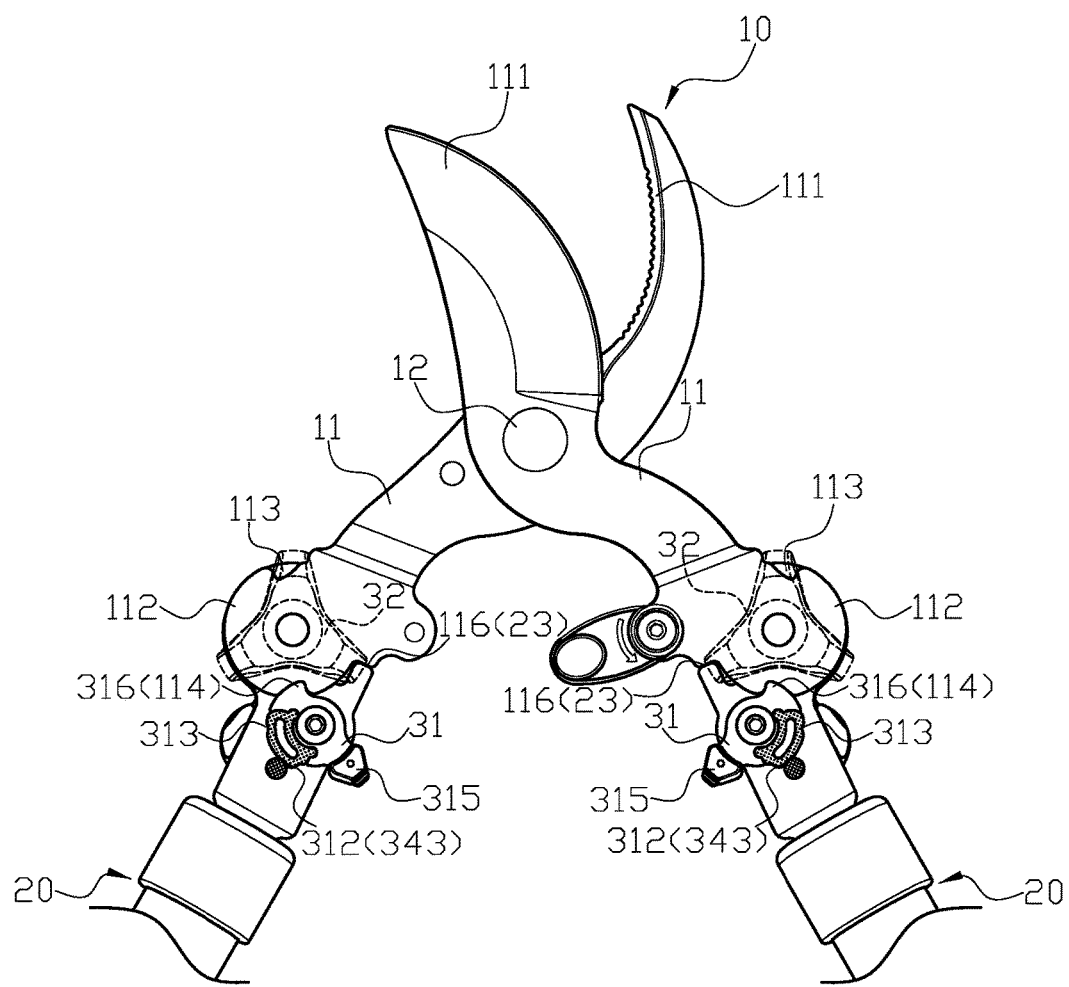
FIG. 5 is a schematic view illustrating the foldable gardening shear of the present invention is in use.

When the foldable gardening shear of the present invention is in use, before the knobs (32) are locked, a user can press the two pulling blocks (315) downwardly to rotate the control units (31) about the locating pins (343) which are respectively abutted against the first grooves (312), and the protruding portions (315) are tilted to engage with the second engaging slots (114) respectively. Meanwhile, the two abutting blocks (23) are configured to abut against the first abutting portions (116) of the main body (10) respectively such that, having the screws (33) as axles, a force applied on the handles (20) can drive the blades (111) of the main body (10) to achieve the cutting effect (as shown in FIG. 5).

Figure 6:
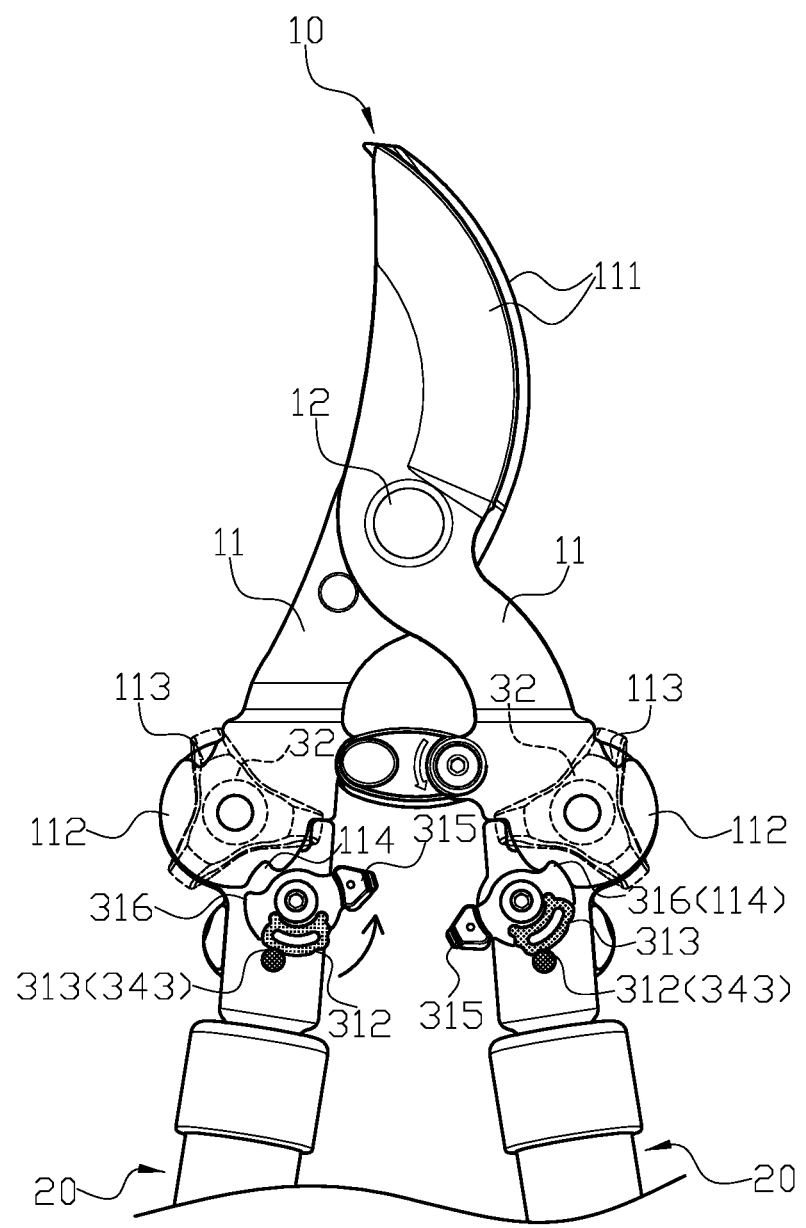
FIG. 6 is a schematic view of the folding process of the foldable gardening shear in the present invention.
Figure 7:
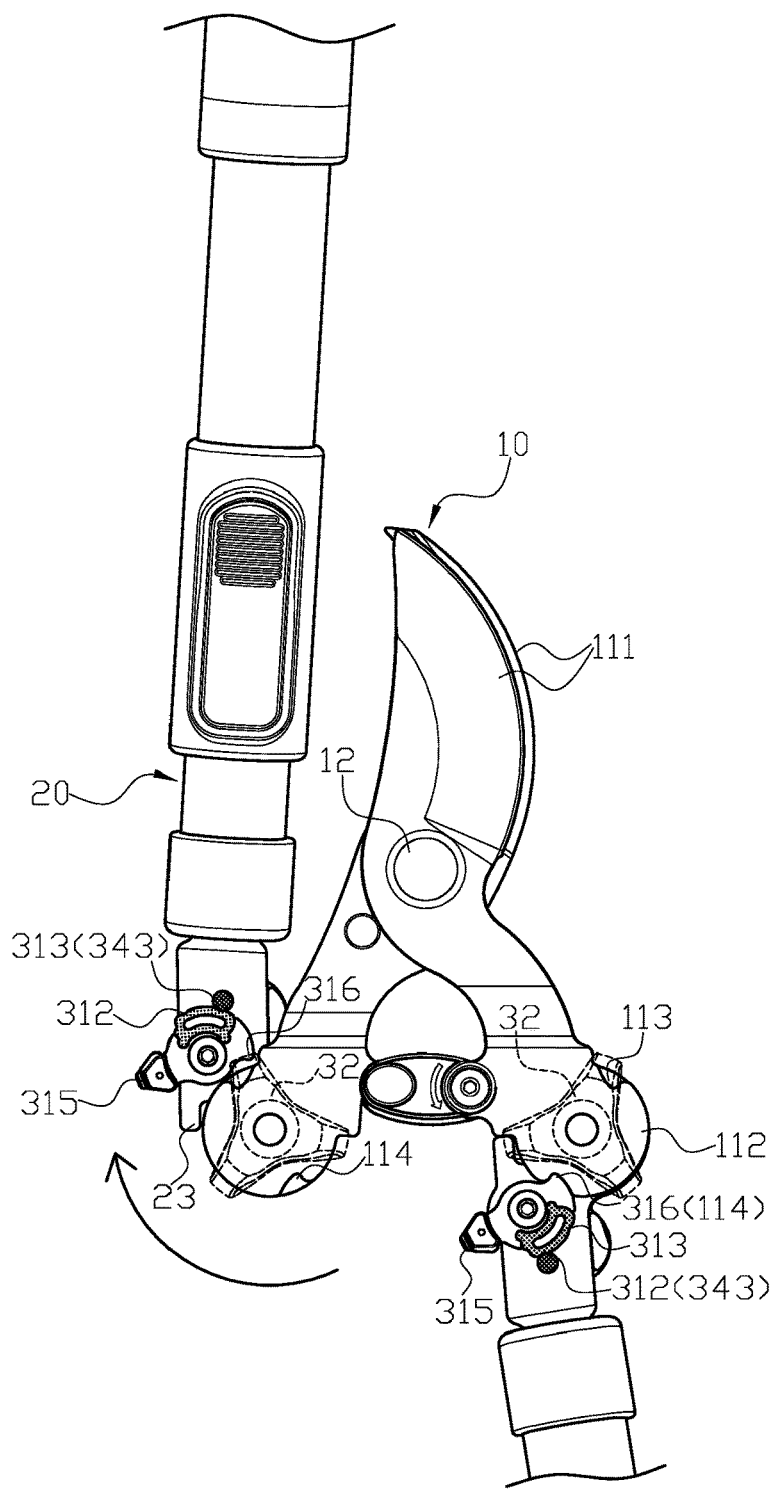
FIG. 7 is a continued view of the folding process of FIG. 6.
Figure 8:
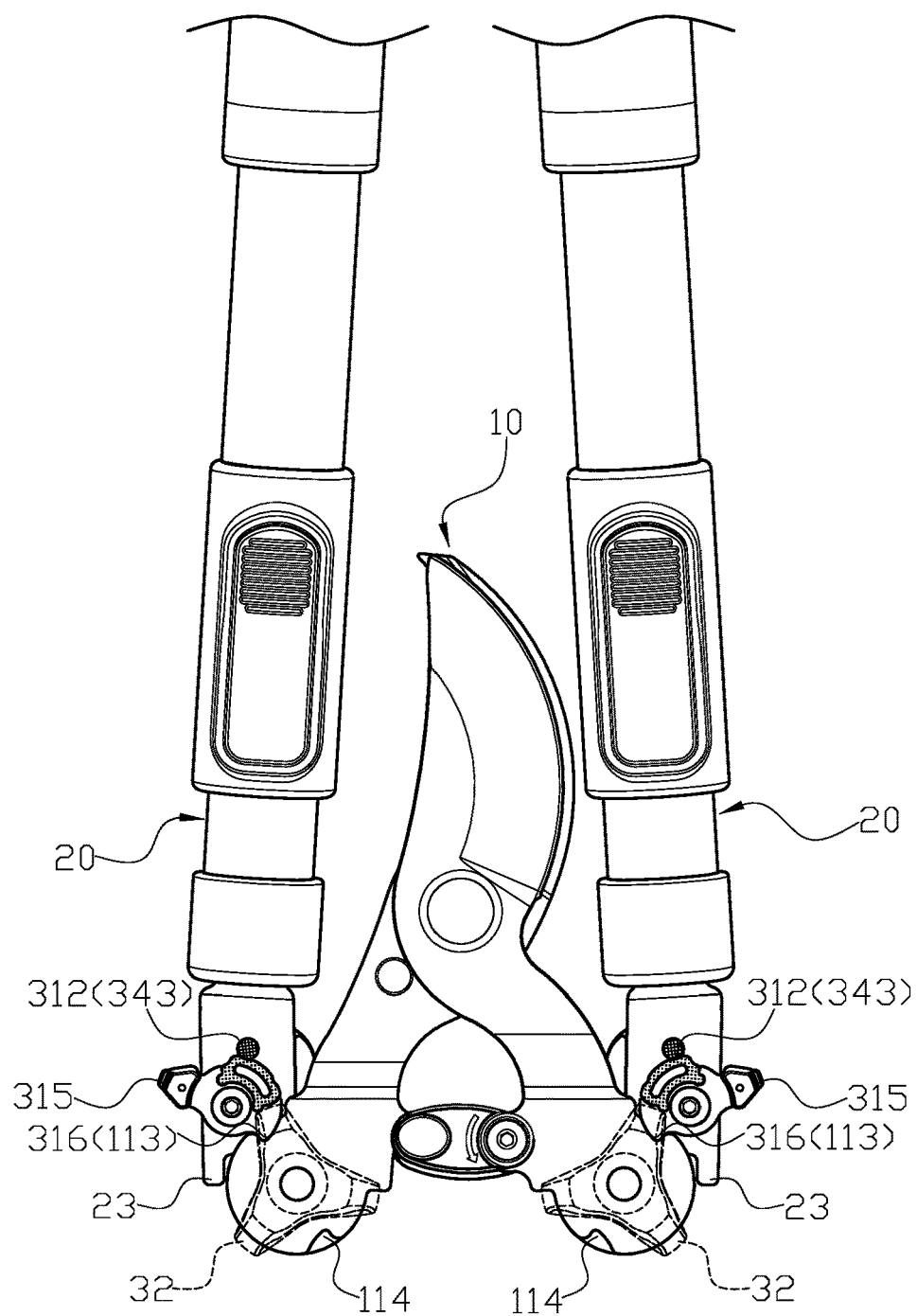
FIG. 8 is a continued and final view of the folding process of FIG. 7.

Referring to FIGS. 6 to 8, the foldable gardening shear of the present invention can be folded for carry or store when not in use, and the knob (32) is configured to be slightly unscrewed to release the control unit (31) from clamping by the two locating members (21). Thus, the control unit (31) can be pulled upwardly, and the locating pin (343) is adapted to disengage with the first groove (312) and to engage with the second groove (313), wherein the locating pin (343) can be engaged with either of the first groove (312) or the second groove (313) to define two limiting positions of the locating pin (343). Meanwhile, the protruding portion (316) of the control unit (31) is disengaged from the second engaging slot (114) such that the handle (20) temporality not secured by the control unit (31) can be folded upwardly by taking the threaded rod (321) as an axle. Thereafter, the control unit (31) can be pulled downwardly back to its initial position, and the protruding portion (316) is configured to engage with the first engaging slot (113). Then, the knob (32) is locked to secure the foldable gardening shear of the present invention in a folded position.

In one embodiment, each of the control units (31) is connected to a heterogeneous material (3110) such as rubber and each of the second abutting portions (311) has an elongated hole (3111) penetrating therethrough, which enables the second abutting portion (311) to be compressed and bounce back to an initial position thereof after compressed.

In another embodiment, each of the covers (34) comprises a blocking edge (344) protruding from the inner surface thereof, and the two blocking edges (344) on the two corresponding covers (34) are configured to partially block a lateral opening of the corresponding second connecting portion (22) after the two corresponding covers (34) fit together.

Comparing with conventional gardening shear, the present invention is advantageous because: (i) the handles (20) can be folded upwardly, which enables the gardening shear to be carried and stored easily; and (ii) in the folded position, the handles (20) are respectively located at two lateral sides of the cutting members (11), which can prevent the blades (111) from hurting the user.

Having described the invention by the description and illustrations above, it should be understood that these are exemplary of the invention and are not to be considered as limiting. Accordingly, the invention is not to be considered as limited by the foregoing description, but includes any equivalents.

What is claimed is:

1. A foldable gardening shear comprising: a main body, a pair of handles and a pair of pivot members; and each of the pivot members having a control unit, a knob, a screw and a pair of covers;
wherein the main body comprises a first pivot pin pivotally connect to a pair of cutting members at a middle portion of the main body; each of the cutting members has a blade formed at an upper portion thereof, and the two blades are configured to couple together to achieve the cutting effect; each of the cutting members has a first connecting portion formed at a lower end thereof, and when the pair of blades is coupled together, a width between the two first connecting portions is wider than the coupled blades; each of the first connecting portions has a first engaging slot and a second engaging slot respectively formed at an upper edge and a lower edge thereof, and a first engaging hole penetrates through a middle portion of the first connecting portion; each of the cutting members further comprises a stepped first abutting portion located at a lower end thereof adjacent to the first connecting portion;
wherein each of the handles has a pair of locating members formed at an upper end thereof, and the two locating members located at two corresponding positions are spaced apart by a defined distance to form a second connecting portion therebetween; two lateral edges of the locating members are coupled together to form an abutting block; each of the two locating members comprises a first connecting hole, a second connecting hole, and a through hole respectively penetrating therethrough and arranged from top to bottom, and each of the two first connecting holes, the two second connecting holes, and the two through holes are respectively aligned with each other;
wherein each of the control units comprises a second abutting portion, and a first groove and a second groove are formed thereon and spaced apart by a defined distance; a third connecting hole penetrates through a middle portion of the control unit; a pulling block is coupled to an edge of the control unit, and an upper edge of the control unit has a concave to form a protruding portion at an edge of the control unit opposed to the pulling block; each of the knobs has a threaded rod protruding from an inner surface thereof, and each of the covers comprises a second engaging hole and a third engaging hole; the pair of covers is configured to fit together, and at least one of the two covers has a locating pin protruding from an inner surface thereof; and
wherein each of the two first connecting portions is put into the corresponding second connecting portion of the handle after the corresponding control unit, and the third connecting hole is aligned with the two second connecting holes on the handle while the two first connecting holes of the handle are aligned with the first engaging hole of the first connecting portion; the protruded pulling block is coupled at an inner edge of the locating members to enable the control unit to be operated; the two corresponding covers of the pivot member are configured to fit together to surround the two locating members, and the locating pin is adapted to sequentially pass through one of the two aligned through holes, the second connecting portion, and the other through hole; the threaded rod of the knob is configured to sequentially pass through the second engaging hole of the cover at a first side of the first engaging hole, the first connecting hole of the locating member at the first side of the first engaging hole, the first engaging hole, the first connecting hole of the corresponding locating member at a second side of the first engaging hole, and the second engaging hole of the corresponding cover at the second side of the first engaging hole to engage with a nut while the screw is adapted to sequentially pass through the third engaging hole of the cover at a first side of the third connecting hole, the second connecting hole of the locating member at the first side of the third connecting hole, the third connecting hole, the second connecting hole of the corresponding locating member at a second side of the third connecting hole, and the third engaging hole of the corresponding cover at the second side of the third connecting hole to engage with a nut, thereby connecting the handle and the pivot member to the main body; wherein before the knobs are locked, the two pulling blocks are configured to be pressed downwardly to respectively rotate the two control units about the locating pins which are respectively abutted against the first grooves, and the protruding portions are tilted to engage with the second engaging slots respectively; and the two abutting blocks are configured to abut against the first abutting portions of the main body respectively such that, having the screws as axles, a force applied on the handles is adapted to drive the blades of the main body to achieve the cutting effect.

2. The foldable gardening shear of claim 1, wherein each of the second abutting portions has a curved surface.

3. The foldable gardening shear of claim 1, wherein each of the second abutting portions is resilient and configured to bounce back to an initial position thereof after compressed.

4. The foldable gardening shear of claim 1, wherein each of the control units is connected to a heterogeneous material and each of the second abutting portions has an elongated hole penetrating therethrough, which enables the second abutting portion to be compressed and to bounce back to the initial position thereof after compressed.

5. The foldable gardening shear of claim 4, wherein the heterogenous material includes rubber.

6. The foldable gardening shear of claim 1, wherein each of the pulling blocks is coupled to the edge of the corresponding control unit to form a T-shape.

7. The foldable gardening shear of claim 1, wherein each of the covers comprises a blocking edge protruding from the inner surface thereof.

* * * * *